United States Patent
Lee et al.

(10) Patent No.: US 7,424,074 B2
(45) Date of Patent: Sep. 9, 2008

(54) OPTIMIZING DETECTOR TARGET POLYNOMIALS IN READ/WRITE CHANNELS TO ACHIEVE BEST ERROR RATE PERFORMANCE IN DISK DRIVES

(75) Inventors: Yuan Xing Lee, San Jose, CA (US); Richard Leo Galbraith, Rochester, MN (US); Travis Oenning, Rochester, MN (US); Weldon Hanson, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 596 days.

(21) Appl. No.: 11/110,187

(22) Filed: Apr. 19, 2005

(65) Prior Publication Data

US 2006/0235919 A1 Oct. 19, 2006

(51) Int. Cl.
*H04B 1/10* (2006.01)
(52) U.S. Cl. .......................... 375/350; 375/263
(58) Field of Classification Search .......... 375/286, 375/287, 290, 262, 263, 341
See application file for complete search history.

(56) References Cited

U.S. PATENT DOCUMENTS

| | | | |
|---|---|---|---|
| 5,889,823 A * | 3/1999 | Agazzi et al. ............... 375/341 |
| 5,995,561 A * | 11/1999 | Yamasaki et al. ........... 375/341 |
| 6,137,881 A | 10/2000 | Oh et al. |
| 6,282,251 B1 * | 8/2001 | Worstell ...................... 375/341 |
| 6,385,239 B1 | 5/2002 | Okamoto et al. |
| 6,754,340 B1 | 6/2004 | Ding |
| 2003/0031242 A1 | 2/2003 | Awad et al. |
| 2003/0123364 A1 | 7/2003 | Nakajima et al. |

* cited by examiner

*Primary Examiner*—Khanh C Tran
(74) *Attorney, Agent, or Firm*—Townsend and Townsend and Crew LLP; Patrick Duncan (57) ABSTRACT

Embodiments of the invention provide techniques for optimizing the detector target polynomials in read/write channels to achieve the best error rate performance in recording devices. In one embodiment, a method of obtaining a detector target polynomial of a read/write channel to achieve best error rate performance in a recording device comprises: providing an initial detector target for the read/write channel; measuring a noise autocorrelation of the read/write channel at the output of equalizer using channel hardware; computing a noise autocorrelation at the output of the $1^{st}$ stage target based on the measured noise autocorrelation of the read/write channel at the output of equalizer; calculating optimal coefficients for the noise whitening filter; and obtaining the optimal detector target polynomial of the read/write channel using the calculated coefficients for noise whitening filter.

29 Claims, 8 Drawing Sheets

$$\begin{bmatrix} Rxx(9) \\ Rxx(8) \\ Rxx(9) \\ Rxx(6) \\ Rxx(5) \\ Rxx(4) \\ Rxx(3) \\ Rxx(2) \\ Rxx(1) \\ Rxx(0) \\ Rxx(1) \\ Rxx(2) \\ Rxx(3) \\ Rxx(4) \\ Rxx(5) \\ Rxx(6) \\ Rxx(7) \\ Rxx(8) \\ Rxx(9) \end{bmatrix} = \begin{bmatrix} S_0 & S_1 & S_2 & 0 & 0 & 0 & 0 & 0 & 0 & 0 & 0 & 0 & 0 & 0 & 0 & 0 & 0 & 0 & 0 \\ S_1 & S_0 & S_1 & S_2 & 0 & 0 & 0 & 0 & 0 & 0 & 0 & 0 & 0 & 0 & 0 & 0 & 0 & 0 & 0 \\ S_2 & S_1 & S_0 & S_1 & S_2 & 0 & 0 & 0 & 0 & 0 & 0 & 0 & 0 & 0 & 0 & 0 & 0 & 0 & 0 \\ 0 & S_2 & S_1 & S_0 & S_1 & S_2 & 0 & 0 & 0 & 0 & 0 & 0 & 0 & 0 & 0 & 0 & 0 & 0 & 0 \\ 0 & 0 & S_2 & S_1 & S_0 & S_1 & S_2 & 0 & 0 & 0 & 0 & 0 & 0 & 0 & 0 & 0 & 0 & 0 & 0 \\ 0 & 0 & 0 & S_2 & S_1 & S_0 & S_1 & S_2 & 0 & 0 & 0 & 0 & 0 & 0 & 0 & 0 & 0 & 0 & 0 \\ 0 & 0 & 0 & 0 & S_2 & S_1 & S_0 & S_1 & S_2 & 0 & 0 & 0 & 0 & 0 & 0 & 0 & 0 & 0 & 0 \\ 0 & 0 & 0 & 0 & 0 & S_2 & S_1 & S_0 & S_1 & S_2 & 0 & 0 & 0 & 0 & 0 & 0 & 0 & 0 & 0 \\ 0 & 0 & 0 & 0 & 0 & 0 & S_2 & S_1 & S_0 & S_1 & S_2 & 0 & 0 & 0 & 0 & 0 & 0 & 0 & 0 \\ 0 & 0 & 0 & 0 & 0 & 0 & 0 & S_2 & S_1 & S_0 & S_1 & S_2 & 0 & 0 & 0 & 0 & 0 & 0 & 0 \\ 0 & 0 & 0 & 0 & 0 & 0 & 0 & 0 & S_2 & S_1 & S_0 & S_1 & S_2 & 0 & 0 & 0 & 0 & 0 & 0 \\ 0 & 0 & 0 & 0 & 0 & 0 & 0 & 0 & 0 & S_2 & S_1 & S_0 & S_1 & S_2 & 0 & 0 & 0 & 0 & 0 \\ 0 & 0 & 0 & 0 & 0 & 0 & 0 & 0 & 0 & 0 & S_2 & S_1 & S_0 & S_1 & S_2 & 0 & 0 & 0 & 0 \\ 0 & 0 & 0 & 0 & 0 & 0 & 0 & 0 & 0 & 0 & 0 & S_2 & S_1 & S_0 & S_1 & S_2 & 0 & 0 & 0 \\ 0 & 0 & 0 & 0 & 0 & 0 & 0 & 0 & 0 & 0 & 0 & 0 & S_2 & S_1 & S_0 & S_1 & S_2 & 0 & 0 \\ 0 & 0 & 0 & 0 & 0 & 0 & 0 & 0 & 0 & 0 & 0 & 0 & 0 & S_2 & S_1 & S_0 & S_1 & S_2 & 0 \\ 0 & 0 & 0 & 0 & 0 & 0 & 0 & 0 & 0 & 0 & 0 & 0 & 0 & 0 & S_2 & S_1 & S_0 & S_1 & S_2 \\ 0 & 0 & 0 & 0 & 0 & 0 & 0 & 0 & 0 & 0 & 0 & 0 & 0 & 0 & 0 & S_2 & S_1 & S_0 & S_1 \\ 0 & 0 & 0 & 0 & 0 & 0 & 0 & 0 & 0 & 0 & 0 & 0 & 0 & 0 & 0 & 0 & S_2 & S_1 & S_0 \end{bmatrix}^{-1} \begin{bmatrix} Rmm(9) \\ Rmm(8) \\ Rmm(7) \\ Rmm(6) \\ Rmm(5) \\ Rmm(4) \\ Rmm(3) \\ Rmm(2) \\ Rmm(1) \\ Rmm(0) \\ Rmm(1) \\ Rmm(2) \\ Rmm(3) \\ Rmm(4) \\ Rmm(5) \\ Rmm(6) \\ Rmm(7) \\ Rmm(8) \\ Rmm(9) \end{bmatrix}$$

$$\begin{bmatrix} Rxx(9) \\ Rxx(8) \\ Rxx(9) \\ Rxx(6) \\ Rxx(5) \\ Rxx(4) \\ Rxx(3) \\ Rxx(2) \\ Rxx(1) \\ Rxx(0) \\ Rxx(1) \\ Rxx(2) \\ Rxx(3) \\ Rxx(4) \\ Rxx(5) \\ Rxx(6) \\ Rxx(7) \\ Rxx(8) \\ Rxx(9) \end{bmatrix} = \begin{bmatrix} S_0 & S_1 & S_2 & S_3 & S_4 & 0 & 0 & 0 & 0 & 0 & 0 & 0 & 0 & 0 & 0 & 0 & 0 & 0 & 0 \\ S_1 & S_0 & S_1 & S_2 & S_3 & S_4 & 0 & 0 & 0 & 0 & 0 & 0 & 0 & 0 & 0 & 0 & 0 & 0 & 0 \\ S_2 & S_1 & S_0 & S_1 & S_2 & S_3 & S_4 & 0 & 0 & 0 & 0 & 0 & 0 & 0 & 0 & 0 & 0 & 0 & 0 \\ S_3 & S_2 & S_1 & S_0 & S_1 & S_2 & S_3 & S_4 & 0 & 0 & 0 & 0 & 0 & 0 & 0 & 0 & 0 & 0 & 0 \\ S_4 & S_3 & S_2 & S_1 & S_0 & S_1 & S_2 & S_3 & S_4 & 0 & 0 & 0 & 0 & 0 & 0 & 0 & 0 & 0 & 0 \\ 0 & S_4 & S_3 & S_2 & S_1 & S_0 & S_1 & S_2 & S_3 & S_4 & 0 & 0 & 0 & 0 & 0 & 0 & 0 & 0 & 0 \\ 0 & 0 & S_4 & S_3 & S_2 & S_1 & S_0 & S_1 & S_2 & S_3 & S_4 & 0 & 0 & 0 & 0 & 0 & 0 & 0 & 0 \\ 0 & 0 & 0 & S_4 & S_3 & S_2 & S_1 & S_0 & S_1 & S_2 & S_3 & S_4 & 0 & 0 & 0 & 0 & 0 & 0 & 0 \\ 0 & 0 & 0 & 0 & S_4 & S_3 & S_2 & S_1 & S_0 & S_1 & S_2 & S_3 & S_4 & 0 & 0 & 0 & 0 & 0 & 0 \\ 0 & 0 & 0 & 0 & 0 & S_4 & S_3 & S_2 & S_1 & S_0 & S_1 & S_2 & S_3 & S_4 & 0 & 0 & 0 & 0 & 0 \\ 0 & 0 & 0 & 0 & 0 & 0 & S_4 & S_3 & S_2 & S_1 & S_0 & S_1 & S_2 & S_3 & S_4 & 0 & 0 & 0 & 0 \\ 0 & 0 & 0 & 0 & 0 & 0 & 0 & S_4 & S_3 & S_2 & S_1 & S_0 & S_1 & S_2 & S_3 & S_4 & 0 & 0 & 0 \\ 0 & 0 & 0 & 0 & 0 & 0 & 0 & 0 & S_4 & S_3 & S_2 & S_1 & S_0 & S_1 & S_2 & S_3 & S_4 & 0 & 0 \\ 0 & 0 & 0 & 0 & 0 & 0 & 0 & 0 & 0 & S_4 & S_3 & S_2 & S_1 & S_0 & S_1 & S_2 & S_3 & S_4 & 0 \\ 0 & 0 & 0 & 0 & 0 & 0 & 0 & 0 & 0 & 0 & S_4 & S_3 & S_2 & S_1 & S_0 & S_1 & S_2 & S_3 & S_4 \\ 0 & 0 & 0 & 0 & 0 & 0 & 0 & 0 & 0 & 0 & 0 & S_4 & S_3 & S_2 & S_1 & S_0 & S_1 & S_2 & S_3 \\ 0 & 0 & 0 & 0 & 0 & 0 & 0 & 0 & 0 & 0 & 0 & 0 & S_4 & S_3 & S_2 & S_1 & S_0 & S_1 & S_2 \\ 0 & 0 & 0 & 0 & 0 & 0 & 0 & 0 & 0 & 0 & 0 & 0 & 0 & S_4 & S_3 & S_2 & S_1 & S_0 & S_1 \\ 0 & 0 & 0 & 0 & 0 & 0 & 0 & 0 & 0 & 0 & 0 & 0 & 0 & 0 & S_4 & S_3 & S_2 & S_1 & S_0 \end{bmatrix}^{-1} \begin{bmatrix} Rmm(9) \\ Rmm(8) \\ Rmm(7) \\ Rmm(6) \\ Rmm(5) \\ Rmm(4) \\ Rmm(3) \\ Rmm(2) \\ Rmm(1) \\ Rmm(0) \\ Rmm(1) \\ Rmm(2) \\ Rmm(3) \\ Rmm(4) \\ Rmm(5) \\ Rmm(6) \\ Rmm(7) \\ Rmm(8) \\ Rmm(9) \end{bmatrix}$$

OPTIMIZING DETECTOR TARGET POLYNOMIALS IN READ/WRITE CHANNELS TO ACHIEVE BEST ERROR RATE PERFORMANCE IN DISK DRIVES

BACKGROUND OF THE INVENTION

The present invention relates to techniques for improving error rate performance in recording devices and, more particularly, to optimizing detector target polynomials in read/write channels to achieve best error rate performance in disk drives.

In an apparatus for recording and reproducing data in/from recording media, reproduction of data may be carried out by low-pass filtering, and then equalization, followed by data detection, on noisy read-back waveforms. While a low-pass filter cuts off excessive out-of-band noise, an equalizer attempts to shape the waveforms to certain prescribed response so that a data detector can detect data bits from the equalized waveforms with reasonable implementation complexity. The prescribed response is often called equalization target polynomial, or detector target polynomial. For a given equalization target polynomial, the equalizer attempts to minimize the differences, often called errors, between the equalized waveforms and estimated ideal waveforms produced by the convolution of bit sequences produced by data detector and equalization target polynomial. Since the read-back waveforms are often noisy, the errors may contain both noise and mis-equalization errors between the equalized noiseless waveforms and estimated ideal waveforms. The errors have adverse impact on error rate performance of data detector. Different equalization target polynomials result in different errors, and hence different error rate performance of detector. A desirable equalization target polynomial is the one which minimizes the power of errors. Once an equalization target polynomial is chosen, an equalizer can be designed to shape the read-back waveforms to the target response.

In the case where the original data recorded on, for example, a recording disk medium is reproduced by means of a pickup head, there is noise in a waveform of the reproduced signal output of the head. As a method of shaping read-back waveform to certain equalization target polynomial, there has been conventionally used an adaptive equalizer utilizing a finite impulse response (referred to as "FIR", hereinafter) filter. Since different equalization target polynomials result in different error rates, an optimal equalization target polynomial needs to be chosen so that the best error rate performance of read-back waveform may be achieved.

Particularly in recent years, the data recording density on the recording medium has been remarkably increased and inter-symbol interface (ISI) between the recorded data on the medium is increased, and also a noise influence in a data transmission path cannot be ignored because of reduction in amplitude of the reproduction signal. In order to improve the signal reading efficiency with reduction of a bit error rate of recorded or playback waveforms, a playback data detecting method has been employed to detect an optimal playback data by operating a partial response (referred to as "PR", hereinafter) equalization of an automatic adaptive equalizer in combination with a Viterbi decoding unit, whereby data stream of transmission signals is monitored before and after a specified time point so as to select the most likely data pattern closest to a desired data pattern among from the monitored data patterns to thereby obtain the optimal performance of data detection. Various adaptive techniques have been proposed to provide a PR equalization with improved reliability. See, e.g., U.S. Patent Publication No. 2003/0123364 A1 and U.S. Pat. No. 6,385,239. Other examples of adaptive filtering techniques are found in U.S. Patent Publication No. 2003/0031242 A1; and U.S. Pat. Nos. 6,754,340 and 6,137,881.

In disk drive systems, detector target polynomials play a major role in determining the read channel error rate performance. Different detector target polynomials are needed for different heads/media and operation conditions to provide proper shaping to read back signal. An example of a polynomial is [1, a, b, 0, −b, −a, −1], and a target polynomial means any choice of the polynomial with certain constraints. The ideal sample values are the result of convolution of the detector target polynomial with a given input binary sequence. For example, for partial response channel PR4 with target polynomial [1, 0, −1], the all possible ideal sample values are 2 or 0 or −2.

Detector target polynomials, also known as equalization target polynomials, need to be optimized in order to yield the best error rate performance. There could be abundant choices of possible detector target polynomials for use in channels. It is generally not practical to do a brute force search for optimal targets amount all possible targets due to limited time and other practical constraints. A detector target polynomial is thus typically chosen either empirically or by trials of only a handful of targets.

BRIEF SUMMARY OF THE INVENTION

Embodiments of the present invention provide techniques for optimizing the detector target polynomials in read/write channels to achieve the best error rate performance in recording devices such as disk drives.

One current method for the target search involves the following: (1) conduct a test on three targets (e.g., low density, medium density, and high density targets) to select a target giving the best error rate performance; and (2) perform a limited search for the best target around the target selected in step (1). This approach is easy to implement and relatively fast. On the other hand, if the selected target in step (1) is not close to the optimal target, then the best target obtained in step (2) will not be optimal. Further, the approach is operational condition dependent.

A feature of the invention is directed to a new method of optimizing the detector target polynomials in read/write channels to achieve the best error rate performance in recording devices. The new method optimizes the detector target polynomial in the presence of noisy signal and the constraints of the hardware. In particular, this invention addresses detector target polynomial optimization of a read/write channel whose detector target polynomial comprises a first stage target and a filter. Furthermore, the first stage target is a fixed polynomial, while the filter is a programmable polynomial, which could be a noise whitening filter, or a noise whitening filter followed by a filter matched to the noise whitening filter. The optimization of the detector target polynomial is equivalent to the optimization of the noise whitening filter under the constraint of the first stage target being fixed. Ideally, if the noise autocorrelation can be measured at the output of the first stage target, then an optimal noise whitening filter may be computed in a well-known closed-form expression. However the noise autocorrelation at the output of the first stage target may not be practically measurable; instead, noise autocorrelation may only be measurable at some other stage in a read/write channel, for example at the stage of the output of channel equalizer that equalizes read-back waveforms to equalization target polynomial.

First, an initial detector target polynomial for a read/write channel is provided. The choice of the initial detector target polynomial is not critical to the process of obtaining an optimal detector target polynomial, since initial detector target polynomial is merely for a read/write channel to start functioning. The noise autocorrelation $R_{mm}(n)$ at the output of equalizer with the initial detector target polynomial is measured using channel hardware. Second, the measured noise autocorrelation $R_{mm}(n)$ is used to calculate the noise autocorrelation $R_{xx}(n)$ at the output of the first stage target via matrix inversion. The matrix is constructed only based on the polynomial coefficients of the filter, which is either a noise whitening filter, or a noise whitening filter followed by a filter matched to the noise whitening filter. Third, the calculated noise autocorrelation $R_{xx}(n)$ is used to compute the values of the optimal coefficients for the noise-whitening filter. The optimal detector target polynomial is the product of the first stage target polynomial and the filter polynomial which is the noise-whitening filter, or the noise-whitening filter followed up a filter matched to the noise whitening filter. The above steps may be repeated for additional runs (measurements) to count for any variations in noise autocorrelation measurements. Once an equalization target polynomial is optimized, any kind of adaptive equalization can be applied.

An aspect of the present invention is directed to a method of obtaining a detector target polynomial of a read/write channel to achieve best error rate performance in a recording device. The method comprises providing an initial detector target polynomial for the read/write channel; measuring a noise autocorrelation of the read/write channel at the output of equalizer with the initial detector target using channel hardware; computing a noise autocorrelation of the first stage target based on the measured noise autocorrelation of the read/write channel at the output of equalizer via matrix inversion; calculating coefficients for the noise whitening filter based on the computed noise autocorrelation of the first stage target; and obtaining the detector target polynomial of the read/write channel using the calculated coefficients.

In some embodiments, the initial detector target for the read/write channel is selected from predefined targets stored in memory. The initial detector target for the read/write channel may be obtained from a previous search for the read/write channel to achieve best error rate performance in the recording device, or a target which works over a broad range of recording densities. The initial detector target polynomial is a partial response channel target polynomial. The initial detector target polynomial further includes a first stage target polynomial and a filter which is a noise whitening filter.

In specific embodiments, the first stage target is a partial response channel polynomial $(1-D^2)$; the filter polynomial is a noise whitening filter polynomial $(1+p_1 D+p_2 D^2)$; the detector target polynomial or equalization target polynomial is the product of the first stage polynomial and the noise whitening filter polynomial, which is $1+p_1 D+(p_2-1)D^2-p_1 D^3-p_2 D^4$. The noise autocorrelation $R_{xx}(n)$ of the first stage target is related to the measured noise autocorrelation $R_{mm}(n)$ of the read/write channel at the output of equalizer according to an expression:

$$R_{mm}(n)=g(n) \otimes R_{xx}(n), \quad (1)$$

where $$g(n)=f(n) \otimes f(-n)=[S_2, S_1, S_0, S_1, S_2],$$

$$f(n)=[1, p_1, p_2],$$

$$S_0=1+p_1^2+p_2^2,$$

$$S_1=p_1+p_1 p_2, \text{ and}$$

$$S_2=p_2.$$

Since $g(n)$ is only dependent on the initial $p_1$ and $p_2$ which are from the initial equalization target polynomial, the equation (1) can be solved via matrix inversion so that $R_{xx}(n)$ can be obtained. The matrix is constructible from $g(n)$.

In some embodiments, the initial detector target for the read/write channel is selected from predefined targets stored in memory. The initial detector target for the read/write channel may be obtained from a previous search for the read/write channel to achieve best error rate performance in the recording device, or a target which works over a broad range of recording densities. The initial detector target polynomial is a partial response channel target polynomial. The initial detector target polynomial further includes a first stage target polynomial and a filter which further comprises noise whitening filter, and a matched filter matched to the noise whitening filter.

In specific embodiments, the first stage target is a partial response channel polynomial $(1-D^2)$; the filter polynomial is a noise whitening filter polynomial $(1+p_1 D+p_2 D^2)$ multiplied with its matched filter polynomial $(p_2+p_1 D+D^2)$; and the equalization target polynomial is a product of the first stage target polynomial and the filer, which is $1+aD+bD^2-bD^4-aD^5-D^6$, where $a=p_1/p_2+p_1$ and $b=(p_1^2+1)/p_2+p_2-1$. The noise autocorrelation $R_{xx}(n)$ of the first stage target is related to the measured noise autocorrelation $R_{mm}(fn)$ of the read/write channel at the output of equalizer according to an expression:

$$R_{mm}(n)=g(n) \otimes R_{xx}(n), \quad (2)$$

where $$g(n)=f(n) \otimes f(-n)=[S_4, S_3, S_2, S_1, S_0, S_1, S_2, S_3, S_4],$$

$$f(n)=[1, a, 1+b, a, 1],$$

$$S_0=b^2+2a^2+2b+3,$$

$$S_1=2ab+4a,$$

$$S_2=a^2+2b+2,$$

$$S_3=2a, \text{ and}$$

$$S_4=1.$$

Since $g(n)$ is only dependent on the initial $a$ and $b$ which are from the initial equalization target polynomial, the equation (2) can be solved via matrix inversion so that $R_{xx}(n)$ can be obtained. The matrix is constructible from $g(n)$.

Calculating coefficients for the noise whitening filter has a well-known closed-form equation. When the noise whitening filter having only two taps $p_1$ and $p_2$ they can be calculated using the following equations:

$$\begin{bmatrix} p_1 \\ p_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}$$

$$a=(p_1/p_2)+p_1$$

$$b=(p_1^2+1)/p_2+p_2-1.$$

In some embodiments, the method further comprises repeating the steps of providing an initial detector target for the read/write channel, measuring a noise autocorrelation of the read/write channel at the output of equalizer, computing a noise autocorrelation of the first stage target polynomial, calculating coefficients for the noise whitening filter, and obtaining the detector target polynomial of the read/write channel, so as to obtain different targets, and selecting the target yielding the best error rates from the different targets to account for $R_{mm}(n)$ measurement repeatability.

Another aspect of the invention is directed to a computer readable storage medium storing a computer program for obtaining a detector target polynomial of a read/write channel to achieve best error rate performance in a recording device. The computer program comprises code for providing an initial detector target for the read/write channel; code for computing a noise autocorrelation of the first stage target based on a measured noise autocorrelation of the read/write channel at the equalizer output; code for calculating coefficients for the noise whitening filter from the computed noise autocorrelation of the first stage target polynomial; and code for obtaining the detector target polynomial of the read/write channel using the calculated coefficients for the noise whitening filter.

In accordance with another aspect of the present invention, a disk drive system comprises a read/write channel having an initial equalization target polynomial; channel hardware configured to measure a noise autocorrelation of the read/write channel at the output of equalizer with the initial equalization target polynomial; a module configured to compute a noise autocorrelation of the first stage target polynomial based on the measured noise autocorrelation of the read/write channel at the output of equalizer; and a module configured to calculate coefficients for the noise whitening filter based on the computed noise autocorrelation of the first stage target polynomial. A detector target polynomial of the read/write channel is obtained from the calculated coefficients for the noise whitening filter to achieve best error rate performance in the disk drive system. The detector target polynomial is the product of the first stage target polynomial and the filter which is a noise whitening filter, or a noise whitening filter followed by a filter matched to the noise whitening filter.

DETAILED DESCRIPTION OF THE INVENTION

Figure 1:
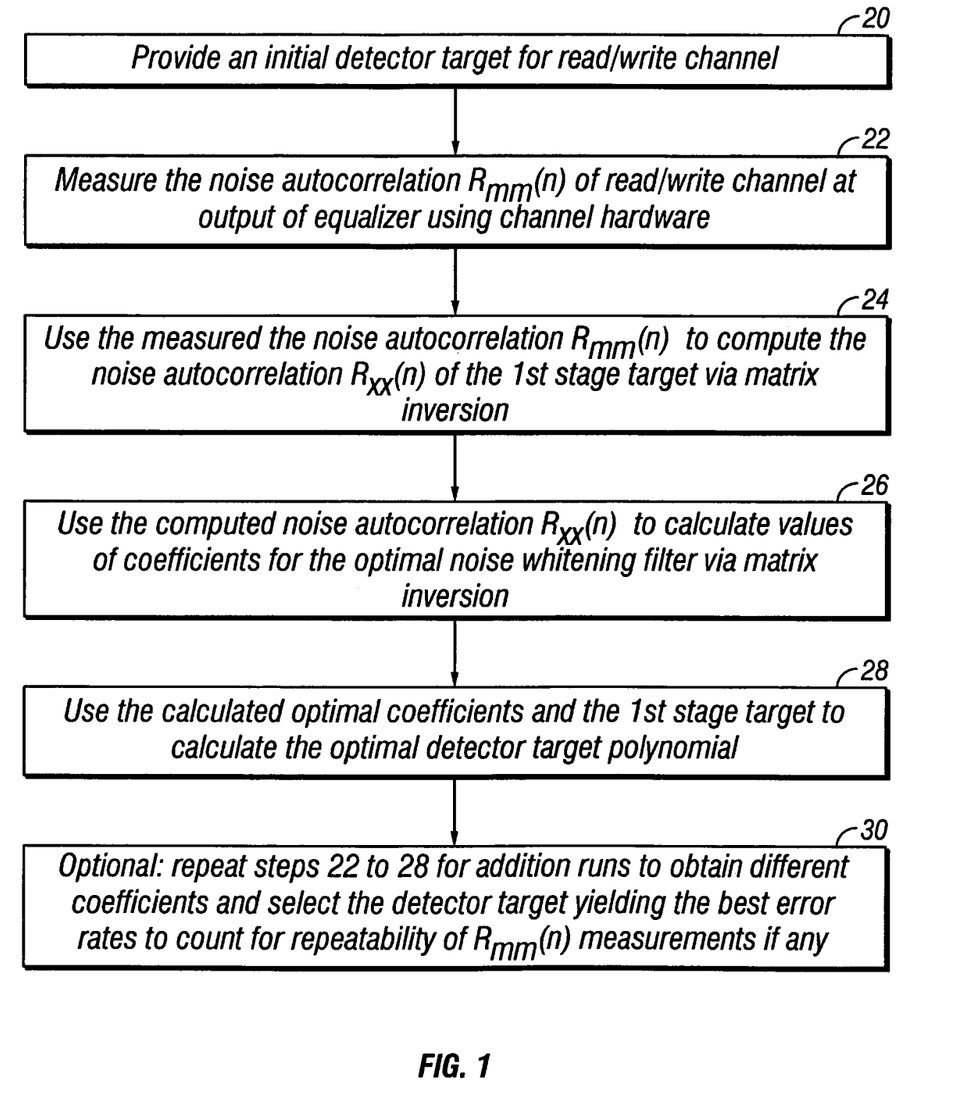
FIG. 1 is a flow diagram of a method of optimizing the detector target polynomials in read/write channels according to an exemplary embodiment of the present invention.

FIG. 1 is a flow diagram of a method of optimizing the detector target polynomials in read/write channels to achieve the best error rate performance in recording devices according to an exemplary embodiment of the present invention. In step 20, an initial detector target polynomial for a read/write channel is provided. In the present example, the detector target polynomial comprises a first stage partial response target polynomial and a filter polynomial, which is a noise whitened filter, or a noise whitening filter followed by a filter matched to the noise whitening filter); Step 22 measures the noise autocorrelation $R_{mm}(n)$ of the read/write channel at the output of equalizer using channel hardware. In step 24, the measured noise autocorrelation $R_{mm}(n)$ is used to calculate the noise autocorrelation $R_{xx}(n)$ of the first stage partial response target. In step 26, the calculated noise autocorrelation $R_{xx}(n)$ is used to compute the values of the optimal coefficients of the noise whitening filter which has N coefficients with $N \geq 1$. In step 28, the computed optimal coefficients are used to compute optimal equalization target polynomial. Step 30 is optional, which involves repeating steps 22-28 for additional runs (measurements) to select the target yielding the best error rates from the different coefficients to count for measurement variations of $R_{mm}(n)$ if any.

Figure 2:
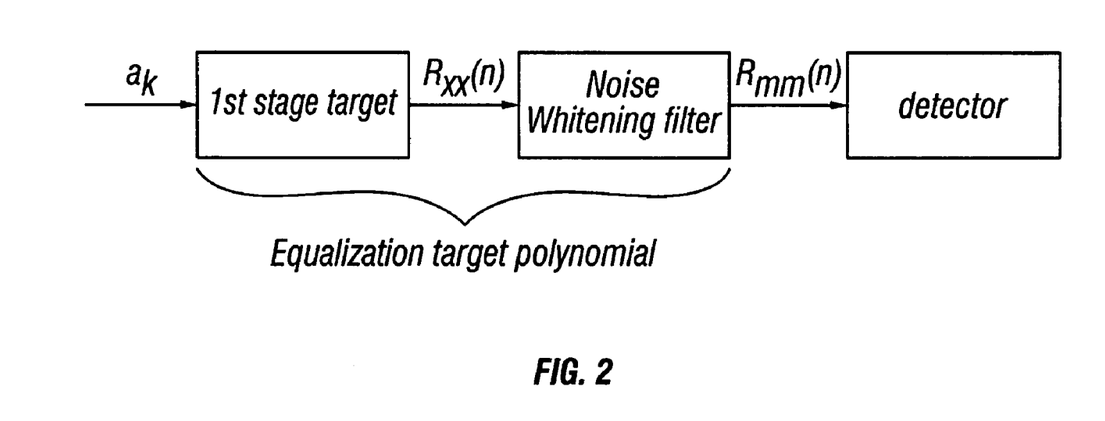
FIG. 2 shows a read/write channel structure which comprises a first stage target and a noise whitening filter according to an embodiment of the invention.

FIG. 2 shows a read/write channel structure according to an embodiment of the invention. FIG. 2 shows detector target polynomial consists of a $1^{st}$ stage target and a filter, which is a noise whitening filter. The number of coefficients in the noise whitening filter is required to be more than or equal to one. The detector target polynomial or equalization target polynomial is the product of the $1^{st}$ stage target polynomial and the noise whitening filter polynomial.

Figure 3:
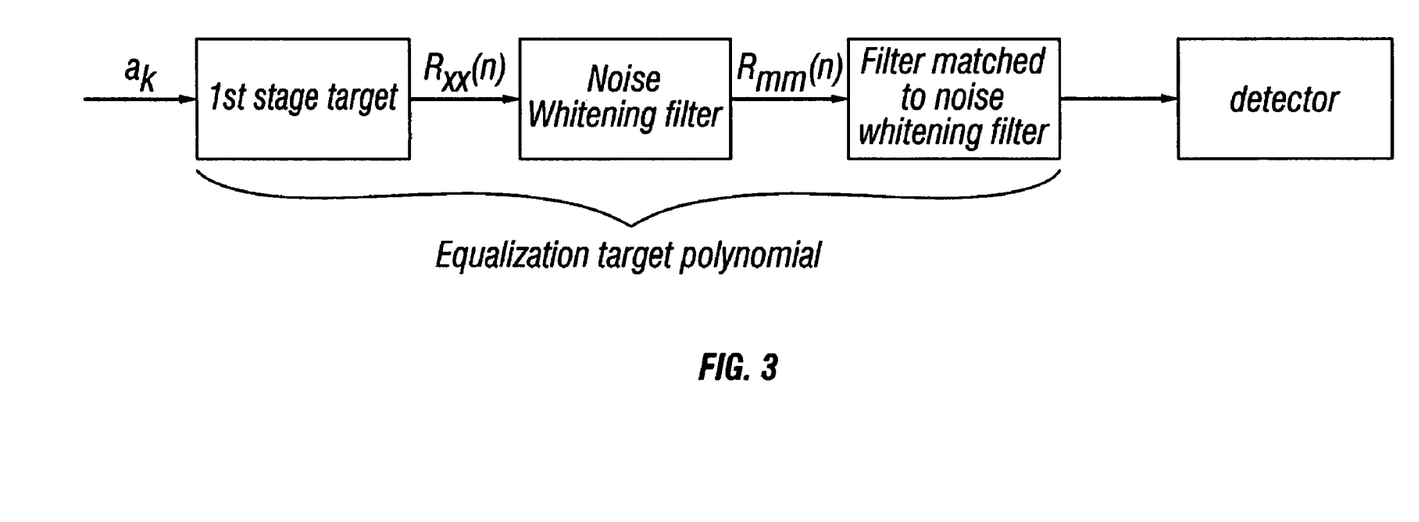
FIG. 3 shows a read/write channel structure which comprises a first stage target, a noise whitening filter, and a filter matched to the noise whitening filter according to another embodiment of the invention.

FIG. 3 shows a read/write channel structure according to another embodiment of the invention. FIG. 3 shows detector target polynomial consists of a $1^{st}$ stage target and a filter, which is a noise whitening filter followed by a filter matched to the noise whitening filter. The number of coefficients in the noise whitening filter is required to be more than or equal to one. The detector target polynomial or equalization target polynomial is the product of the $1^{st}$ stage target polynomial, the noise whitening filter polynomial, and the filter polynomial matched to the noise whitening filter.

Figure 4:
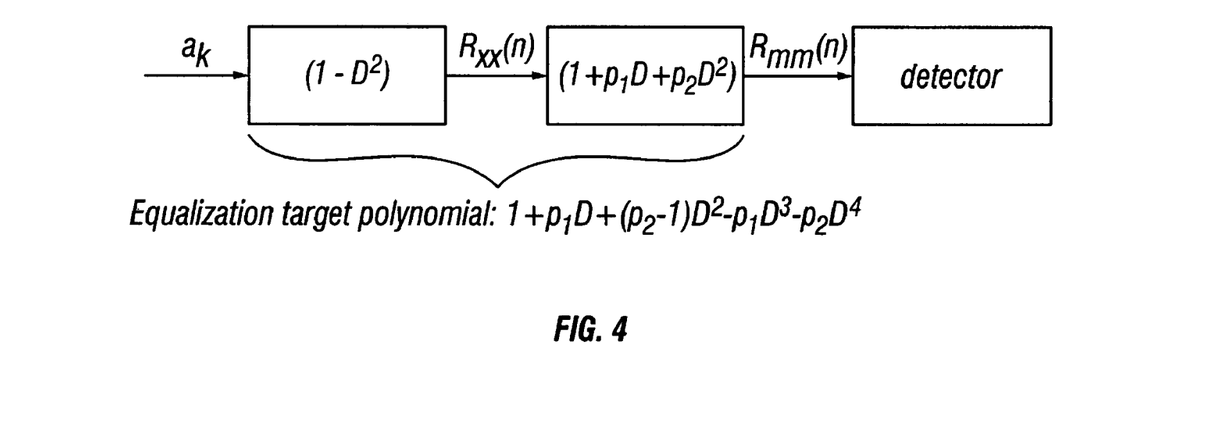
FIG. 4 shows a read/write channel structure which comprises a first stage target of PR4 polynomial and a 2-tap noise whitening filter according to another embodiment of the invention.

FIG. 4 shows a read/write channel structure according to another embodiment of the invention. FIG. 4 shows detector target polynomial consists of a $1^{st}$ stage PR4 target and a 2-tap filter, which is a noise whitening filter with two coefficients. The detector target polynomial or equalization target polynomial is the product of the PR 4 polynomial $(1-D^2)$ and the 2-tap noise whitening filter polynomial $(1+p_1 D+p_2 D^2)$, which is $1+p_1 D+(p_2-1)D^2-p_1 D^3-p_2 D^4$.

Figure 5:
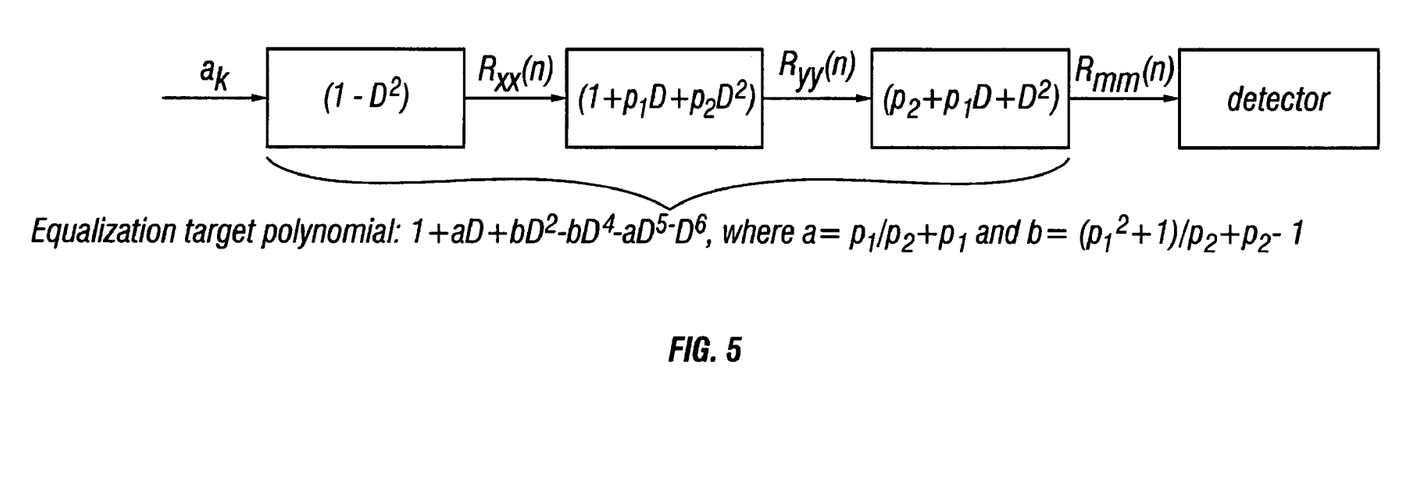
FIG. 5 shows a read/write channel structure which comprise a first stage target of PR4 polynomial, a 2-tap noise whitening filter, and a 2-tap filter matched to the 2-tap noise whitening filter according to another embodiment of the invention.

FIG. 5 shows a read/write channel structure according to another embodiment of the invention. FIG. 5 shows detector target polynomial consists of a $1^{st}$ stage PR4 target and a filter, which is a noise whitening filter with two coefficients followed by a filter with two coefficients matched to the noise whitening filter. The detector target polynomial or equalization target polynomial is the product of the PR 4 polynomial $(1-D^2)$, the 2-tap noise whitening filter polynomial $(1+p_1D+p_2D^2)$, and a filter matched to the noise whitening filter $(p_2+p_1D+D^2)$, which is $1+aD+bD^2-bD^4-aD^5-D^6$. One can compute the coefficients a and b of the equalization target if the values of the coefficients $p_1$ and $p_2$ of the noise whitening filter are know, and vice versa. In this example, the initial equalization target polynomial $1+aD+bD^2-bD^4-aD^5-D^6$ is provided in step 20 of FIG. 1. The target may be a default detector target that is chosen from predefined targets stored in firmware or on the surface of the recording disk, or from the last known effective target stored in memory such as an EEPROM (i.e., from a previous target search).

Figure 6:
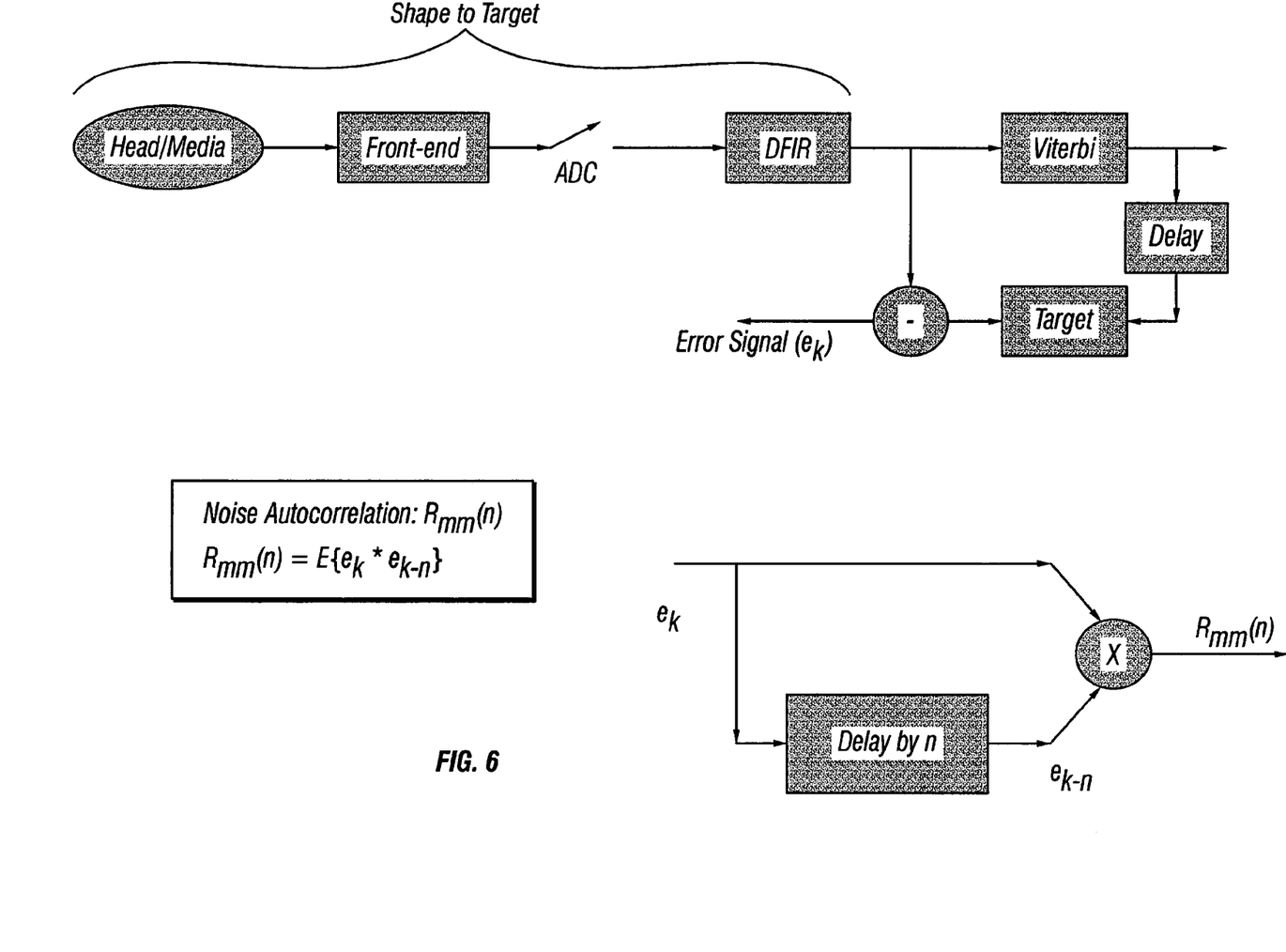
FIG. 6 illustrates step 22 of the target optimization method which measures the noise autocorrelation $R_{mm}(n)$ of the read/write channel at the output of equalizer using channel hardware.

FIG. 6 illustrates step 22 of the target optimization method, which measures the noise autocorrelation $R_{mm}(n)$ of the read/write channel at the output of equalizer using channel hardware. As shown in FIG. 2 to 5, the shape to target includes an input signal from a head/media 302 transmitted through a front-end 304 (e.g., a low pass filter), an analog-digital converter ADC 306, and a discrete finite impulse response (DFIR) filter 308. The output sample from the DFIR is split into two paths 310 and 312. In the path 312, the signal is decoded by a Viterbi detector or decoding unit 316, time adjusted by a delay block 318, and equalized by a target block 320 to produce an estimated ideal sample. The target block 320 has the equalization target polynomial of FIG. 2. The actual sample from the DFIR 308 along the path 310 and the estimated ideal sample from the target block 320 are compared, and the difference between them at every sampling instant is the errors $e_k$.

As seen in FIG. 6, the noise autocorrelation $R_{mm}(n)$ for the read/write channel of FIG. 2 to 5 is represented by $$R_{mm}(n)=E\{e_k{}^*e_{k-n}\}$$

wherein $e_{k-n}$ is the error signal delayed by n bits. Thus, step 22 provides the measured noise autocorrelation $R_{mm}(n)$ of the read/write channel using channel hardware.

FIG. 4 shows the relationship between the noise autocorrelation $R_{mm}(n)$ of the equalization target of the read/write channel and the noise autocorrelation $R_{xx}(n)$ of the $1^{st}$ stage partial response target (PR4). In the embodiment shown, the noise whitening filter f(D) is represented as follows:

$$f(D)=(1+p_1D+p_2D^2),$$

and f(n) is denoted as [1 $p_1$, $p_2$].

Then $R_{mm}(n)=f(n) \otimes f(-n) \otimes R_{xx}(n)$ wherein $\otimes$ represents convolution. The following equation is derived from the above relationship:

$$g(n)=f(n) \otimes f(-n)=[S_2, S_1, S_0, S_1, S_2],$$

where $S_0=1+p_1{}^2+p_2{}^2,$ $S_1=p_1+p_1p_2,$ and $S_2=p_2.$

FIG. 5 shows the relationship between the noise autocorrelation $R_{mm}(n)$ of the equalization target of the read/write channel and the noise autocorrelation $R_{xx}(n)$ of the $1^{st}$ stage partial response target (PR4). From the noise autocorrelation $R_{xx}(n)$ to the noise autocorrelation $R_{mm}(n)$, an intermediate noise autocorrelation $R_{yy}(n)$ is disposed between the noise whitening filter polynomial $(1+p_1D+p_2D^2)$ and the matched filter polynomial $(p_2+p_1D+D^2)$ which is matched to the noise whitening filter polynomial. In this embodiment, the combination of these two polynomials is represented by f(D) as follows:

$$f(D)=1+aD+(1+b)D^2+aD^3+D^4$$

wherein $a=(p_1/p_2)+p_1$ and $b=(p_1{}^2+1)/p_2+p_2-1$.

The combined polynomial f(D) is denoted as f(n)=[1, a, 1+b, a, 1]. Then $$R_{mm}(n)=f(n) \otimes f(-n) \otimes R_{xx}(n)$$

wherein $\otimes$ represents convolution. The following equation is derived from the above relationship:

$$g(n)=f(n) \otimes f(-n)=[S_4, S_3, S_2, S_1, S_0, S_1, S_2, S_3, S_4]$$

where $S_0=b^2+2a^2+2b+3$ $S_1=2ab+4a$ $S_2=a^2+2b+2$ $S_3=2a$ $S_4=1.$

The following expression represents the relationship between $R_{mm}(n)$ and $R_{xx}(n)$:

$$R_{mm}(n)=g(n) \otimes R_{xx}(n).$$

By placing the expression in matrix form and using matrix inversion, $R_{xx}(n)$ can be calculated. If one assumes that $R_{mm}(n)$ and $R_{xx}(n)$ are of length of $N_1$ and $N_2$, respectively, then $$R_{mm}(n)=[R_{mm}(0), R_{mm}(1), \ldots, R_{mm}(N_1-1)]; \text{ and}$$

$$R_{xx}(n)=[R_{xx}(0), R_{xx}(1), \ldots, R(N_2-1)].$$

Figure 7:
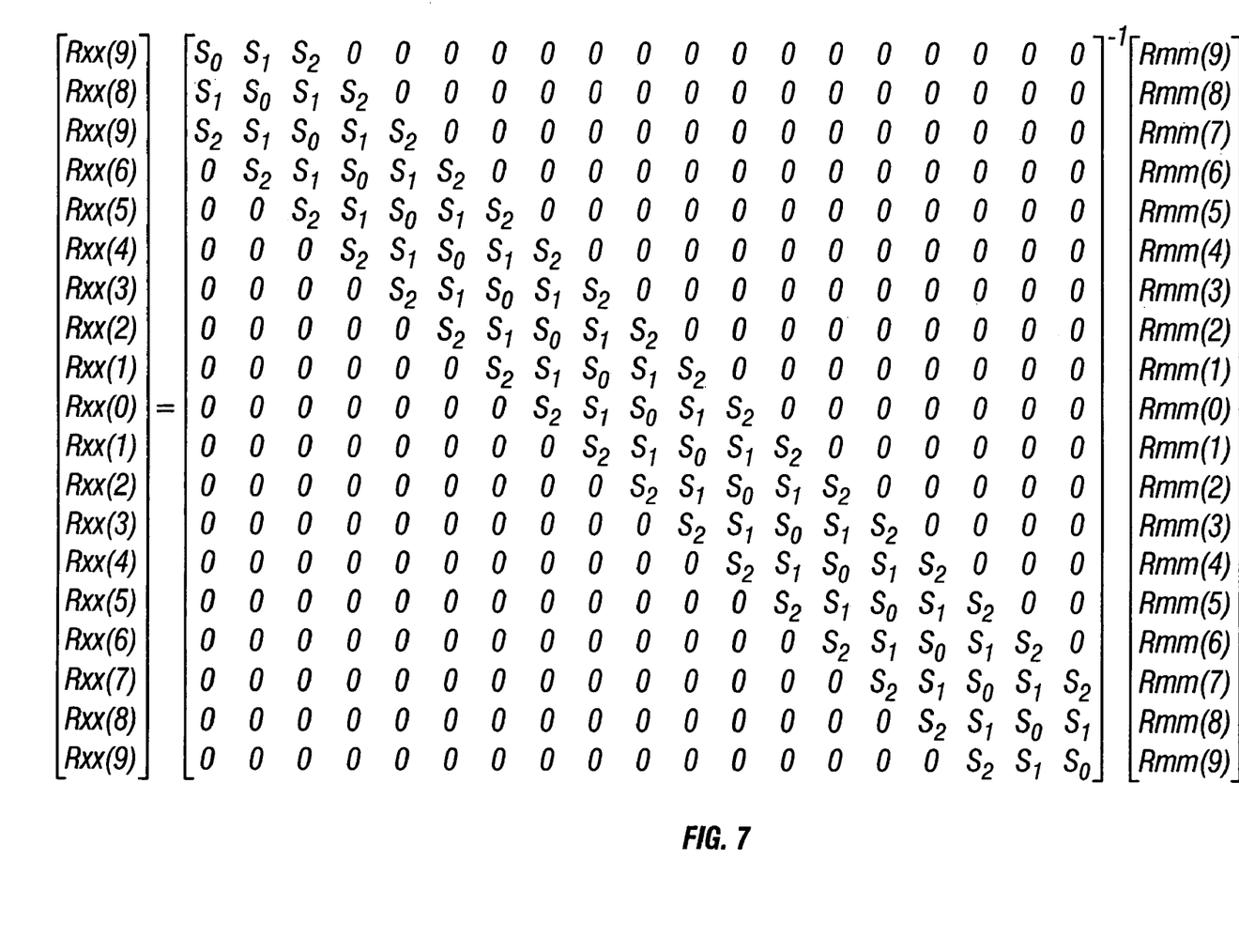
FIG. 7 shows an example of a matrix representation of the relationship between $R_{mm}(n)$ and $R_{xx}(n)$ if the channel detector target polynomial in FIG. 4 is used.

FIG. 7 shows an example of a matrix representation of the relationship between $R_{mm}(n)$ and $R_{xx}(n)$ where $N_1$ and $N_2$ are both equal to 10 for detector target polynomial in FIG. 4. Of course, the matrix inversion technique can be used to calculate $R_{xx}(n)$ from measured $R_{mm}(n)$ for other lengths. The above procedure (step 24) produces the calculated noise autocorrelation $R_{xx}(n)$ of the first stage partial response channel target using the measured noise autocorrelation $R_{mm}(n)$ of the equalization target.

Figure 8:
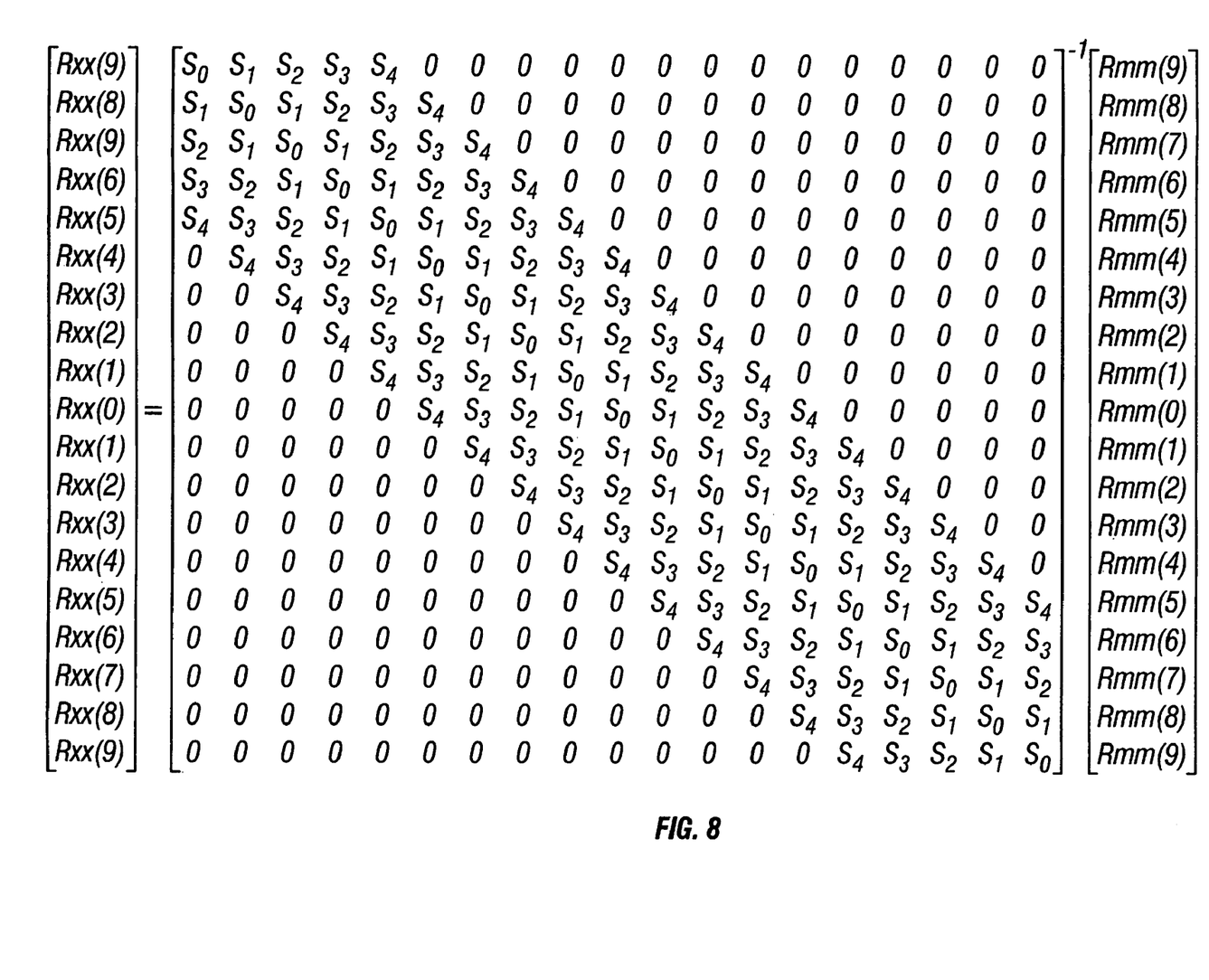
FIG. 8 shows an example of a matrix representation of the relationship between $R_{mm}(n)$ and $R_{xx}(n)$ if the channel detector target polynomial in FIG. 5 is used.

FIG. 8 shows an example of a matrix representation of the relationship between $R_{mm}(n)$ and $R_{xx}(n)$ where $N_1$ and $N_2$ are both equal to 10 for detector target polynomial in FIG. 5. Of course, the matrix inversion technique can be used to calculate $R_{xx}(n)$ from measured $R_{mm}(n)$ for other lengths. The above procedure (step 24) produces the calculated noise autocorrelation $R_{xx}(n)$ of the first stage partial response channel target using the measured noise autocorrelation $R_{mm}(n)$ of the equalization target.

In step 26, the calculated noise autocorrelation $R_{xx}(n)$ is used to compute the values of the optimal coefficients for the noise whitening filter. The number of coefficients of the noise whitening filter is required to be no less than 1. In one of the preferred embodiments, the noise whitening filter has two coefficients, namely $p_1$ and $p_2$. Based on this equalization target model involving the noise whitening filter, the values of the optimal coefficients $p_1$ and $p_2$ can be computed by matrix inversion according to the following equation:

$$\begin{bmatrix} p_1 \\ p_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}$$

In step 28, the computed optimal coefficients $p_1$ and $p_2$ are used to compute the optimal detector target. In one of the preferred embodiments shown in FIG. 5, the optimal coefficients a and b of the equalization target can be computed using the following equations:

$$a = (p_1/p_2) + p_1$$

$$b = (p_1^2 + 1)/p_2 + p_2 - 1$$

Step 30 involves repeating steps 22-28 for additional runs to select the target yielding the best error rates. The use of the noise whitening filter and a filter matched to the noise whitening filter in the above-described embodiments is for illustrative purposes. Other equalization polynomials may be used in different embodiments. The optimization method can be implemented for other equalization targets.

Figure 9:
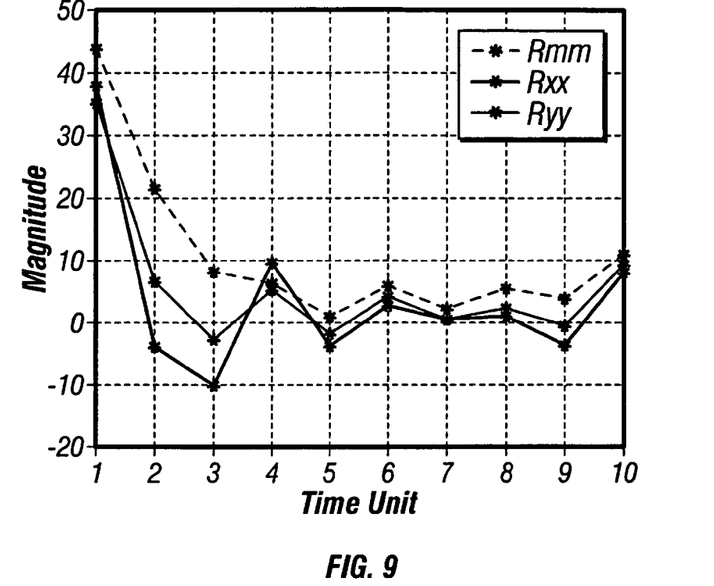
FIG. 9 shows a plot of the measured noise autocorrelation $R_{mm}(f)$ and the computed noise autocorrelations $R_{yy}(n)$ and $R_{xx}(n)$ versus time unit for one example run for detector target polynomial in FIG. 5.

FIG. 9 shows a plot of the measured noise autocorrelation $R_{mm}(n)$ and the computed noise autocorrelations $R_{yy}(n)$ and $R_{xx}(n)$ versus time unit for one run for one head/disk combination using the new method described above for detector target polynomial shown in FIG. 5.

The new optimization method was applied in four test examples involving four different operational conditions for detector target polynomial shown in FIG. 5. In each test example, three measurements of $R_{mm}(n)$ were taken, and the result with the best error rate performance is chosen as the optimized result. The three measurements of the new method are compared with the current method of conducting a test on three targets to select the target with the best error rate performance, and then performing a search for the best target around the selected target. The results of the four test examples include the computed $p_1$, $p_2$, a, b, and ByteER (symbol error rate).

Table 1 summarizes the results of the first test example with a user bit density of 2.0.

TABLE 1

|  | Current Method | New Method (measurement 1) | New Method (measurement 2) | New Method (measurement 3) |
| --- | --- | --- | --- | --- |
| $p_1$ | 0.299 | 0.135 | −0.018 | 0.162 |
| $p_2$ | 0.206 | 0.286 | 0.310 | 0.195 |
| a | 1.75 (7) | 0.609 (3) | 0 (0) | 0.994 (4) |
| b | 4.5 (18) | 2.851 (12) | 2.539 (11) | 4.468 (18) |
| ByteER | −5 | −5.75 | −6.7 | −6 |

Table 2 summarizes the results of the second test example with a user bit density of 2.4.

TABLE 2

|  | Current Method | New Method (measurement 1) | New Method (measurement 2) | New Method (measurement 3) |
| --- | --- | --- | --- | --- |
| $p_1$ | 0.285 | 0.140 | 0.086 | 0.176 |
| $p_2$ | 0.195 | 0.324 | 0.346 | 0.370 |
| a | 1.75 (7) | 0.572 (3) | 0.333 (2) | 0.652 (3) |
| b | 4.75 (19) | 2.474 (10) | 2.254 (10) | 2.160 (9) |
| ByteER | −4.55 | −5.24 | −5.23 | −5.167 |

Table 3 summarizes the results of the third test example with a user bit density of 2.67.

TABLE 3

|  | Current Method | New Method (measurement 1) | New Method (measurement 2) | New Method (measurement 3) |
| --- | --- | --- | --- | --- |
| $p_1$ | 0.330 | 0.253 | 0.248 | 0.188 |
| $p_2$ | 0.233 | 0.172 | 0.306 | 0.338 |
| a | 1.75 (7) | 1.719 (7) | 1.057 (5) | 0.744 (3) |
| b | 4 (16) | 5.342 (22) | 2.776 (11) | 2.403 (10) |
| ByteER | −4.1 | −4.15 | −4.23 | −4.32 |

Table 4 summarizes the results of the fourth test example with a user bit density of 2.94.

TABLE 4

|  | Current Method | New Method (measurement 1) | New Method (measurement 2) | New Method (measurement 3) |
| --- | --- | --- | --- | --- |
| $p_1$ | 0.330 | 0.326 | 0.295 | 0.297 |
| $p_2$ | 0.233 | 0.370 | 0.353 | 0.372 |
| a | 1.75 (7) | 1.208 (5) | 1.132 (5) | 1.098 (5) |
| b | 4.0 (16) | 2.363 (10) | 2.434 (10) | 2.301 (10) |
| ByteER | −3.49 | −3.5 | −3.5 | −3.5 |

Figure 10:
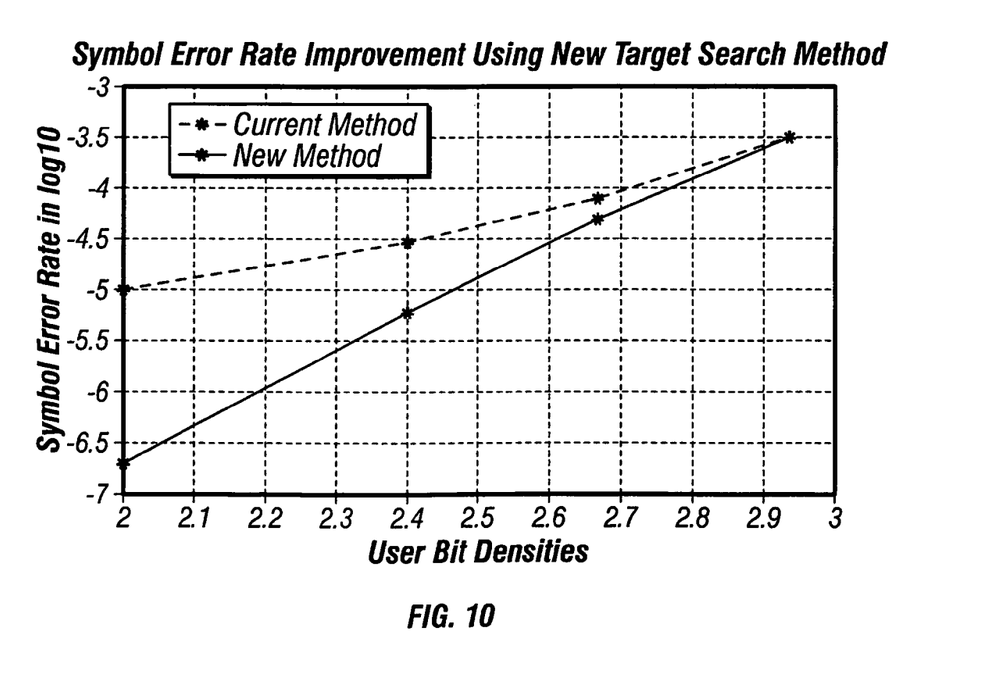
FIG. 10 shows a plot of the symbol error rate versus user bit densities for the current method and the new method for some heads/media combinations for detector target polynomial in FIG. 5.

FIG. 10 shows a plot of the symbol error rate versus user bit densities for the current method and the new method (best of three measurements) using some heads/disk combinations. As seen in FIG. 10, the error rate performance is improved, more drastically at lower user bit densities than at higher user bit densities. It is worthy to note that the measurement variations of $R_{mm}(n)$ can be improved by increasing the number of sectors for $R_{mm}(n)$ measurement, which can reduce the run to run variations of the proposed algorithm significantly.

Figure 11:
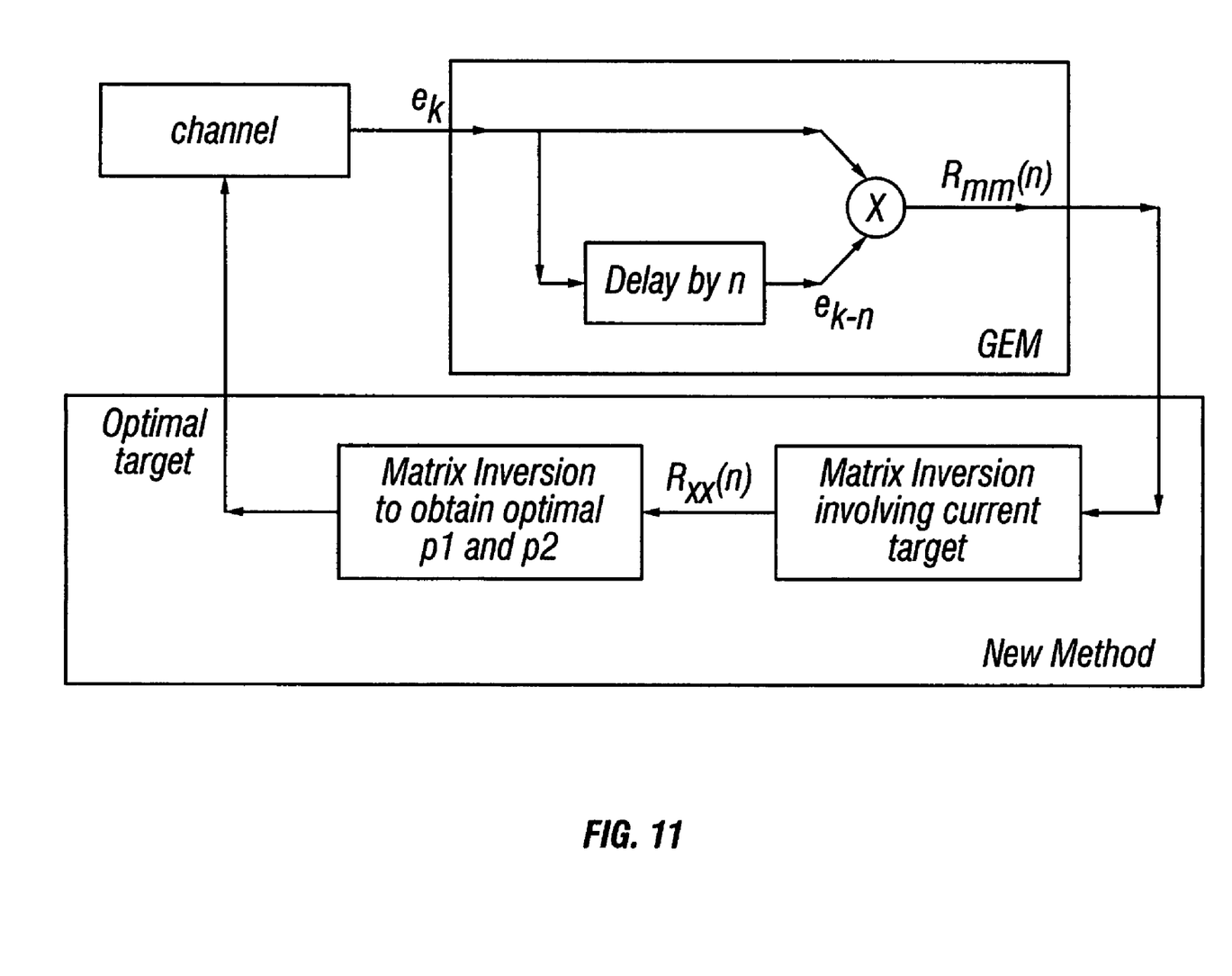
FIG. 11 shows a block diagram illustrating the optimization of the detector target polynomials in a read/write channel according to an embodiment of the present invention.

FIG. 11 shows a block diagram of the General Error Measurement (GEM) block including circuits in channels for performing measurements including noise auto-correlation, and the new method of computing the optimal target for a channel 902. Based on the error $e_k$ from the channel 902, the GEM block 904 generates the measured noise autocorrelation $R_{mm}(n)$ of the channel 902. Using the measured noise autocorrelation $R_{mm}(n)$, the new method block 906 computes the calculated noise autocorrelation $R_{xx}(n)$ by matrix inversion involving the current target (block 908). Using the calculated $R_{xx}(n)$, the new method computes the optimal coefficients $p_1$ and $p_2$ of the noise whitening filter by matrix inversion (block 910). The new method may be encoded in computer software and executed in a processor such as the hard disk controller.

The new method optimizes the detector target polynomial in the presence of noisy signal and the constraints of the hardware. Once a detector target polynomial is optimized, any kind of adaptive equalization can be applied. This approach is easy to implement and fast (typically three runs are sufficient as compared to about 40 runs before), gives optimal targets, is initial detector target independent, and has a scientific basis. It does not depend on operational conditions. The performance improvement is evident, especially at low to moderate recording densities. On average, the reduction in optimization time for targets is reduced by 10 times (i.e., 4 read operations as opposed to 40 read operations).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method of obtaining a detector target polynomial of a read/write channel to achieve best error rate performance in a recording device, the method comprising:
   providing an initial detector target for the read/write channel, the initial detector including a first stage target and a filter;
   measuring a noise autocorrelation of the read/write channel at the output of an equalizer with the initial detector target using channel hardware;
   computing a noise autocorrelation at the output of the 1$^{st}$ stage target based on the measured noise autocorrelation of the read/write channel at the output of an equalizer with the initial detector target;
   calculating optimal coefficients for the filter based on the computed noise autocorrelation at the output of the 1$^{st}$ stage target; and
   obtaining the optimal detector target polynomial of the read/write channel using the calculated coefficients for the filter.

2. The method of claim 1 wherein the initial detector target for the read/write channel is selected from predefined targets stored in memory or given user input.

3. The method of claim 1 wherein the initial detector target for the read/write channel is obtained from a previous search for the read/write channel to achieve best error rate performance in the recording device.

4. The method of claim 1 wherein the filter is a noise whitening filter.

5. The method of claim 4 wherein:
   the first stage target has a first stage target polynomial which is a partial response channel target polynomial $(1-D^2)$;
   the filter has a filter polynomial which is a noise whitening filter polynomial $(1+p_1D+p_2D^2)$ with coefficients $p_1$ and $p_2$; and
   the detector target is $1+p_1D+(p_2-1)D^2-p_1D^3-p_2D^4$.

6. The method of claim 5 wherein the noise autocorrelation $R_{xx}(n)$ of the first stage target polynomial is related to the measured noise autocorrelation $R_{mm}(n)$ of the read/write channel at the output of equalizer according to an expression:

$$R_{mm}(n)=g(n) \otimes R_{xx}(n),$$

where $$g(n)=f(n) \otimes f(-n)=[S_2, S_1, S_0, S_1, S_2],$$

$$f(n)=[1, p_1, p_2],$$

$$S_0=1+p_1^2+p_2^2,$$

$$S_1=p_1+p_1p_2, \text{ and}$$

$$S_2=p_2.$$

7. The method of claim 6 wherein calculating coefficients for the noise whitening filter based on the computed noise autocorrelation at the output of the 1$^{st}$ stage target comprises performing following calculations:

$$\begin{bmatrix} P_1 \\ P_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}.$$

8. The method of claim 1 wherein the filter includes a noise whitening filter followed by a matched filter matched to the noise whitening filter.

9. The method of claim 8 wherein:
   the first stage target has a first stage target polynomial which is a partial response channel polynomial $(1-D^2)$;
   the filter has a filter polynomial which is a noise whitening polynomial $(1+p_1D+p_2D^2)$ with coefficients $p_1$ and $p_2$;
   the matched filter has a matched filter polynomial which is $(p_2+p_1D+D^2)$; and the detector target is $1+aD+bD^2-bD^4-aD^5-D^6$.

10. The method of claim 9 wherein the noise autocorrelation $R_{xx}(n)$ of the first stage target polynomial is related to the measured noise autocorrelation $R_{mm}(n)$ of the read/write channel at the output of equalizer according to an expression:

$$R_{mm}(n)=g(n) \otimes R_{xx}(n),$$

where $$g(n)=f(n) \otimes f(-n)=[S_4, S_3, S_2, S_1, S_0, S_1, S_2, S_3, S_4],$$

$$S_0=b^2+2a^2+2b+3,$$

$$S_1=2ab+4a,$$

$$S_2=a^2+2b+2,$$

$$S_3=2a, \text{ and}$$

$$S_4=1.$$

11. The method of claim 10 wherein calculating coefficients for the noise whitening filter based on the computed noise autocorrelation at the output of the 1$^{st}$ stage target comprises performing following calculations:

$$\begin{bmatrix} P_1 \\ P_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}$$

$$a = (p_1/p_2) + p_1$$

$$b = (p_1^2+1)/p_2 + p_2 - 1.$$

12. The method of claim 1 further comprising:
   repeating the steps of providing an initial detector target for the read/write channel, measuring a noise autocorrelation of the read/write channel, computing a noise autocorrelation of the first stage target polynomial, calculating coefficients for noise whitening filter, and obtaining the detector target polynomial of the read/write channel, so as to obtain different targets, and
   selecting the target yielding the best error rates from the different targets.

13. A computer readable storage medium storing a computer program for obtaining an equalization target polynomial of a read/write channel to achieve best error rate performance in a recording device, the computer program comprising:
   code for providing an initial equalization target for the read/write channel, the initial equalization target including a first stage target and a filter;
   code for computing a noise autocorrelation at the output of the first stage target based on a measured noise autocorrelation of the read/write channel at the output of an equalizer with the initial equalization target;
   code for calculating optimal coefficients for the filter based on the computed noise autocorrelation at the output of the first stage target; and code for obtaining the optimal equalization target polynomial of the read/write channel using the calculated coefficients for the filter.

14. The computer readable storage medium of claim 13 wherein the initial equalization target has an initial equalization polynomial which is a partial response channel polynomial.

15. The computer readable storage medium of claim 13 wherein the filter is a noise whitening filter.

16. The computer readable storage medium of claim 15 wherein:
the first stage target has a first stage target polynomial which is a partial response channel target polynomial $(1-D^2)$;
the filter has a filter polynomial which is a noise whitening filter polynomial $(1+p_1D+p_2D^2)$ with coefficients $p_1$ and $p_2$; and
the equalization target is $1+p_1D+(p_2-1)D^2-p_1D^3-p_2D^4$.

17. The computer readable storage medium of claim 16 wherein the noise autocorrelation $R_{xx}(n)$ of the first stage target polynomial is related to the measured noise autocorrelation $R_{mm}(n)$ of the read/write channel at the output of equalizer according to an expression:

$$R_{mm}(n)=g(n) \otimes R_{xx}(n),$$

where $$g(n)=f(n) \otimes f(-n)=[S_2, S_1, S_0, S_1, S_2],$$

$$f(n)=[1, p_1, p_2],$$

$$S_0=1+p_1^2+p_2^2,$$

$$S_1=p_1+p_1p_2, \text{ and}$$

$$S_2=p_2.$$

18. The computer readable storage medium of claim 17 wherein the code for calculating coefficients for the noise whitening filter based on the computed noise autocorrelation at the output of the first stage target comprises code for performing following calculations:

$$\begin{bmatrix} p_1 \\ p_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}.$$

19. The computer readable storage medium of claim 13 wherein the filter is a noise whitening filter followed by a matched filter matched to the noise whitening filter.

20. The computer readable storage medium of claim 19 wherein:
the first stage target has a first stage target polynomial which is a partial response channel equalization polynomial $(1-D^2)$;
the filter has a filter polynomial which is the noise whitening filter polynomial $(1+p_1D+p_2D^2)$ with coefficients $p_1$ and $p_2$;
the matched filter has a matched filter polynomial which is $(p_2+p_1D+D^2)$; and
the equalization target is $1+aD+bD^2-bD^4-aD^5-D^6$.

21. The computer readable storage medium of claim 20 wherein the noise autocorrelation $R_{xx}(n)$ of the first stage target polynomial is related to the measured noise autocorrelation $R_{mm}(n)$ of the read/write channel at the output of equalizer according to an expression:

$$R_{mm}(n)=g(n) \otimes R_{xx}(n)), \text{ where}$$

$$g(n)=f(n) \otimes f(-n)=[S_4, S_3, S_2, S_1, S_0, S_1, S_2, S_3, S_4],$$

$$S_0=b^2+2a^2+2b+3,$$

$$S_1=2ab+4a,$$

$$S_2=a^2+2b+2,$$

$$S_3=2a, \text{ and}$$

$$S_4=1.$$

22. The computer readable storage medium of claim 21 wherein the code for calculating coefficients for the noise whitening filter based on the computed noise autocorrelation at the output of the first stage target comprises code for performing following calculations:

$$\begin{bmatrix} p_1 \\ p_2 \end{bmatrix} = \begin{bmatrix} R_{xx}(0) & R_{xx}(1) \\ R_{xx}(1) & R_{xx}(0) \end{bmatrix}^{-1} * \begin{bmatrix} -R_{xx}(1) \\ -R_{xx}(2) \end{bmatrix}$$

$$a = (p_1/p_2) + p_1$$

$$b = (p_1^2 + 1)/p_2 + p_2 - 1.$$

23. The computer readable storage medium of claim 13 further comprising:
code for repeating the steps of providing an initial equalization target for the read/write channel, computing a noise autocorrelation at the output of the first stage target, calculating coefficients for the noise whitening filter, and obtaining the equalization target polynomial of the read/write channel, so as to obtain different targets, and
code for selecting the target yielding the best error rates from the different targets.

24. A disk drive system comprising:
a read/write channel having an equalization target which comprise a first stage target and a filter and includes an initial equalization target polynomial;
channel hardware configured to measure a noise autocorrelation of the read/write channel at the output of an equalizer with the initial equalization target polynomial;
a module configured to compute a noise autocorrelation at the output of the first stage target based on the measured noise autocorrelation of the read/write channel at the output of the equalizer; and
a module configured to calculate coefficients for a noise whitening filter based on the computed noise autocorrelation at the output of the first stage target,
wherein an equalization target polynomial of the read/write channel is obtained from the calculated coefficients for the noise whitening filter to achieve best error rate performance in the disk drive system.

25. The disk drive system of claim 24 wherein the initial target polynomial is a partial response channel target polynomial.

26. The disk drive system of claim 24 wherein the filter comprises a noise whitening filter.

27. The disk drive system of claim 26 wherein:
the $1^{st}$ stage target has a $1^{st}$ stage target polynomial which is a partial response channel polynomial $(1-D^2)$;

the filter has a filter polynomial which is a noise whitening filter polynomial $(1+p_1D+p_2D^2)$ with coefficients $p_1$ and $p_2$;

the equalization target is $1+p_1D+(p_2-1)D^2-p_1D^3-p_2D^4$.

28. The disk drive system of claim 24 wherein the filter comprises a noise whitening filter followed by a filter matched to the noise whitening filter.

29. The disk drive system of claim 28 wherein:

the $1^{st}$ stage target has a $1^{st}$ stage target polynomial which is a partial response channel polynomial $(1-D^2)$;

the filter has a filter polynomial which is a noise whitening filter polynomial $(1+p_1D+p_2D^2)$ with coefficients $p_1$ and $p_2$;

the matched filter has a matched filter polynomial which is $(p_2+p_1D+D^2)$; and the equalization target is $1+aD+bD^2-bD^4-aD^5-D^6$.

* * * * *

UNITED STATES PATENT AND TRADEMARK OFFICE
CERTIFICATE OF CORRECTION

PATENT NO. : 7,424,074 B2
APPLICATION NO. : 11/110187
DATED : April 19, 2005
INVENTOR(S) : Lee et al.

It is certified that error appears in the above-identified patent and that said Letters Patent is hereby corrected as shown below:

Column 8, line 40, please delete "$Rxx(n) = [Rxx(0), Rxx(1), \ldots, R(N2-1)]$" and insert

--$Rxx(n) = [Rxx(0), Rxx(1), \ldots, Rxx(N2-1)]$--

Claim 17, column 13, line 28, please delete "$g(n)\ 32\ f(n) \otimes f(-n) = [S2, S1, S0, S1, S2]$"

and insert --$g(n) = f(n) \otimes f(-n) = [S2, S1, S0, S1, S2]$--

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,424,074 B2 Page 1 of 1
APPLICATION NO. : 11/110187
DATED : September 9, 2008
INVENTOR(S) : Lee et al.

It is certified that error appears in the above-identified patent and that said Letters Patent is hereby corrected as shown below:

Column 8, line 40, please delete "Rxx(n) = [Rxx(0), Rxx(1), . . . , R(N2-1)]" and insert --Rxx(n) = [Rxx(0), Rxx(1), . . . , Rxx(N2-1)]--

Claim 17, column 13, line 28, please delete "g(n) 32 f(n) ⊗ f(-n) = [S2, S1, S0, S1, S2]"

and insert --g(n) = f(n) ⊗ f(-n) = [S2, S1, S0, S1, S2]--

This certificate supersedes the Certificate of Correction issued November 25, 2008.

Signed and Sealed this

Twenty-third Day of December, 2008

JON W. DUDAS
*Director of the United States Patent and Trademark Office*